United States Patent [19]

Selleri

[11] 4,412,385
[45] Nov. 1, 1983

[54] GAUGE FOR CHECKING FEATURES - LIKE LINEAR DIMENSIONS - OF A MECHANICAL PIECE

[75] Inventor: Narciso Selleri, Monteveglio, Italy

[73] Assignee: Finike Italiana Marposs S.p.A., S. Marino di Bentivoglio, Italy

[21] Appl. No.: 341,013

[22] Filed: Jan. 20, 1982

[30] Foreign Application Priority Data

Jan. 27, 1981 [IT] Italy .................... 3318 A/81

[51] Int. Cl.³ .................... G01B 5/12; G01B 7/12
[52] U.S. Cl. .................... 33/178 E; 33/174 L
[58] Field of Search ............ 33/147 K, 174 L, 178 B, 33/178 E, 178 F

[56] References Cited

U.S. PATENT DOCUMENTS

| 3,889,380 | 6/1975 | Albertazzi | 33/174 L |
| 3,958,338 | 5/1976 | Anichini et al. | 33/178 E |
| 4,192,073 | 3/1980 | Vanderwal, Jr. | 33/178 B |
| 4,306,455 | 12/1981 | Selleri | 33/178 E |
| 4,344,233 | 8/1982 | Albertazzi | 33/178 E |
| 4,348,814 | 9/1982 | Possati et al. | 33/178 E |
| 4,364,177 | 12/1982 | Possati et al. | 33/178 E |

Primary Examiner—Richard R. Stearns
Attorney, Agent, or Firm—Stevens, Davis, Miller & Mosher

[57] ABSTRACT

An automatic gauge for checking diameters of holes of a mechanical piece comprising plug gauges having protection nosepieces adapted to enter into the holes, a slide carrying the plug gauges, and a hydraulic device for displacing the slide; the contact between the nosepiece of a plug gauge and the piece, caused by errors in the machining or in the positioning of the piece, making a circuit which controls stopping of the slide for preventing the plug gauges from being damaged.

10 Claims, 3 Drawing Figures

GAUGE FOR CHECKING FEATURES - LIKE LINEAR DIMENSIONS - OF A MECHANICAL PIECE

The present invention relates to a gauge for checking the features, like linear dimensions, of a mechanical piece, including a first support for the piece; a second support, the first and the second support being movable one with respect to the other; actuation means to control the relative movement of the supports; gauging means with feeler elements adapted to cooperate with the piece and protective means for protecting the feeler elements, the gauging means being coupled to the second support in order to be selectively arranged in a gauging position, where the feeler elements cooperate with the piece, for providing a signal responsive to the features, and in a rest position; and safety means for preventing the gauging means from getting damaged as a consequence of incorrect piece positioning on the first support, or whenever the piece to be checked has an irregular shape or when any similar circumstances to the foregoing occur.

There are known automatic machines for checking the holes of mechanical pieces by means of electronic plug gauges that have nosepieces adapted for entering into the holes. The gauges are clamped to a plate, or to a slide, which is moved towards the piece by the action of a hydraulic piston. The plate, or the slide, can recoil whenever there is some interference between the nosepiece and the piece as a result of a piece machining defect or of inaccurate piece positioning.

The recoil device consists of a spring that resiliently connects the piston to the plate, or slide, that supports the gauges.

When, due to an undesired interference, the nosepiece of a gauge collides with the piece, the plate, or slide, stops, while the piston continues its stroke and compresses the spring of the recoil device.

In the course of the recoil motion, the nosepiece—or nosepieces—contacting the piece is pushed against the piece with a force that depends on the elastic constant of the spring, its length variation and the inertia of the masses that are stopped, for example, the mass of the gauges, the plate or the slide etc. Under normal circumstances the amount of this force is in the range of tens of Kilograms.

An inconvenience that arises in the known automatic machines provided with a recoil device lies in the entity of the force that is generated in the recoil phase and which is transmitted to the gauge nosepieces. More specifically, when holes that have a very small diameter have to be checked, owing to the little space available, the thickness of the nosepieces is particularly restricted and, as a result of the mechanical stresses due to the force generated in the recoil phase, the nosepieces may get damaged in an irrepairable way. Consequently it becomes necessary to replace the damaged gauges. The replacement of a gauge is a very expensive operation in consideration of both the high cost of the gauge and of the need to effect a new zero setting operation.

The object of the present invention is to provide a gauge that is capable of overcoming the above mentioned inconvenience, by diminishing the entity of the mechanical stresses—due to the interference of the nosepieces with the piece—to values that cannot damage the gauge.

This object is attained through a gauge of the type outlined at the beginning of the present description wherein, according to the invention, the safety means include a first circuit with first circuit means associated with the first support and including the piece, second circuit means associated with the second support and control means connected to the actuation means, the first and the second circuit means being adapted to close the first circuit and switch the control means for stopping the relative movement.

The invention is described in detail with reference to the accompanying drawings, given by way of non-limiting example, in which.

Figure 1:
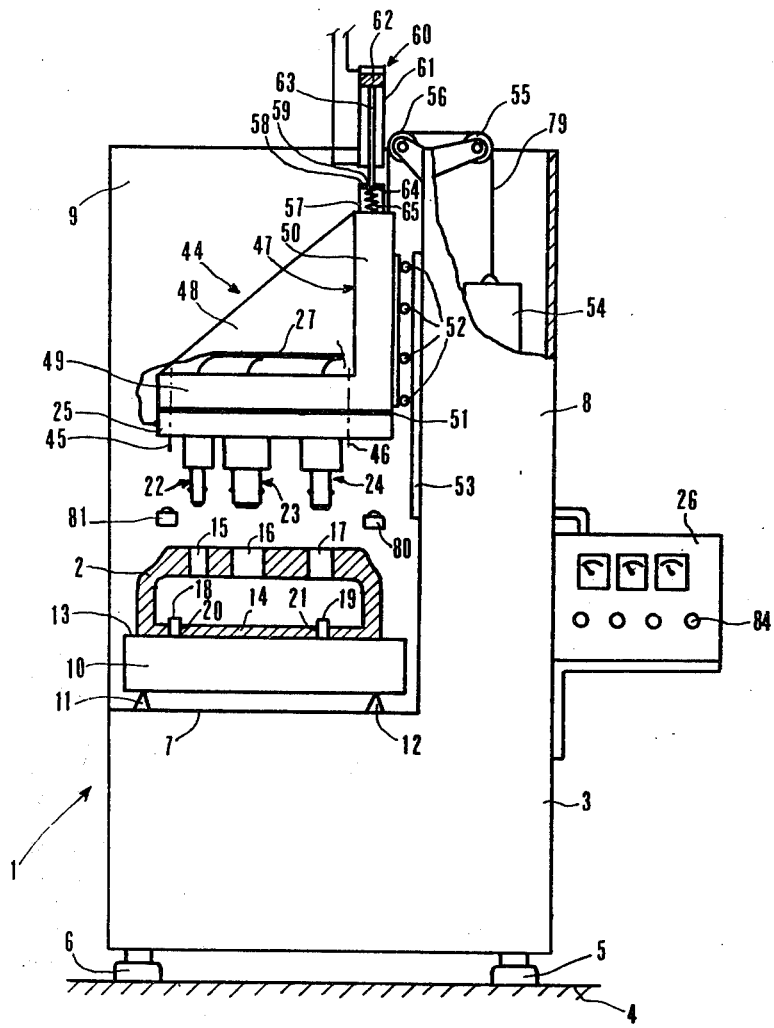
FIG. 1 is a front view of an automatic machine for checking holes of an automobile gearbox.

With reference to FIG. 1, there is shown an automatic machine 1, for checking a gearbox 2 of an automobile, including a metal frame 3 resting on a bed 4 by means of four legs, only two of which 5 and 6 are shown in the drawing.

Frame 3 has a horizontal table 7, a hollow vertical stanchion 8 and a vertical plate 9 fixed to table 7 and to stanchion 8. To the horizontal table 7 there is fixed a plate 10 by means of known constraint means. These constraint means, two of which 11 and 12 are schematically shown in FIG. 1, connect plate 10 to table 7 so that any possible deformations of frame 3 are not transmitted to plate 10.

Plate 10 defines a plane horizontal surface 13 whereupon there rests a wall 14 of gearbox 2. Gearbox 2 has cylindrical holes 15–17 the diameters of which are to be checked. Two reference pins 18 and 19, fixed to plate 10, are inserted into corresponding holes 20 and 21 of wall 14 and ensure the correct positioning of gearbox 2 on plane surface 13.

Figure 3:
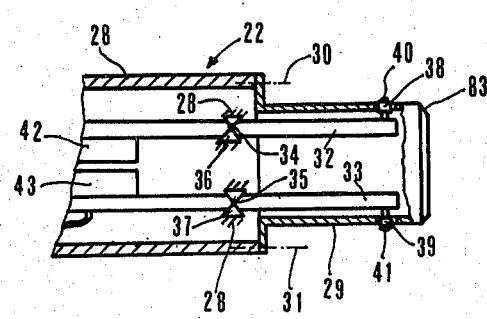
FIG. 3 schematically shows a partially sectioned view, turned 90 degrees with respect to the position shown in FIG. 1, of a plug gauge used for checking one of the holes of the gearbox.

The diameters of holes 15–17 are checked by means of electronic plug gauges 22–24 fixed to a plate 25. The gauges 22–24 are of a known type; one of them, 22, is schematically shown in a partial way, in FIG. 3. The gauges are electrically connected to an amplifying, processing, display and control unit 26 by means of a multicore cable 27.

Gauge 22 has a hollow cylindrical body 28, fixed to plate 25 by means of screws not shown in the drawings. To body 28 there is fixed a nosepiece 29 by means of screws that have geometrical axes marked in FIG. 3 with reference numbers 30 and 31. Nosepiece 29 is hollow and coaxial with body 28.

Two movable arms 32 and 33 are located inside body 28 and nosepiece 29. Arms 32 and 33 can rotate about fulcrums 34 and 35 defined by constraint means 36 and 37 that connect the arms 32 and 33 to body 28. Arms 32 and 33 carry at an end stems 38 and 39; feelers 40 and 41, manufactured with industrial diamonds, are fixed to stems 38 and 39.

To arms 32 and 33—in an opposite position to that of feelers 40 and 41 with respect to fulcrums 34 and 35—are fixed two elements 42 and 43 of an inductive position transducer, for example a differential transformer transducer or a transducer with pot cores.

The purpose of nosepiece 29 is just that of protecting arms 32 and 33 and the transducer.

Figure 2:
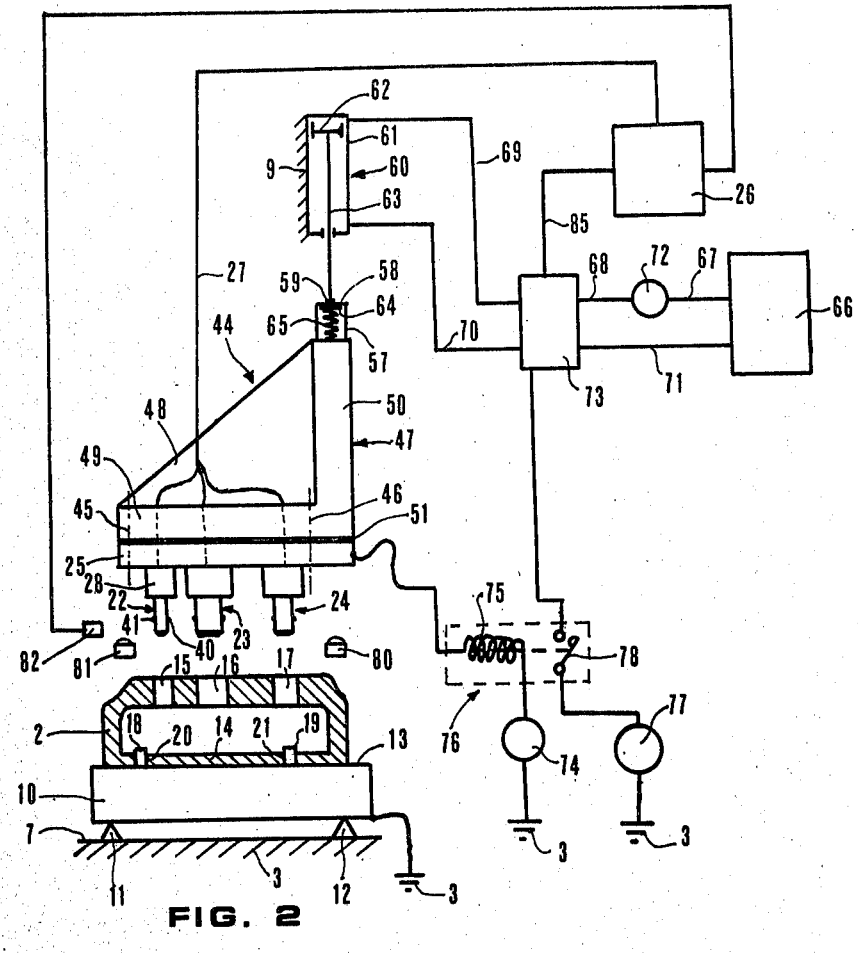
FIG. 2 is a sketch, partially in the form of a block diagram, showing the hydraulic and electric circuits of the machine shown in FIG. 1.

Plate 25, to which are fixed gauges 22–24, is fixed to a slide 44, FIGS. 1 and 2, by means of screws that have geometrical axes marked with reference numbers 45 and 46.

Slide 44 comprises an angle iron 47 stiffened by means of a plate 48 coupled to the two wings 49 and 50 of the angle iron 47. Between wing 49 and plate 25 there is placed a film 51 of insulating material, for example, mica or "Bakelite" (registered trademark).

A film of insulating material is also associated with the screws for fixing plate 25 to wing 49 so that plate 25 as well as gauges 22–24 are electrically insulated with respect to slide 44.

Slide 44 further includes rollers 52 associated with wing 50 and vertically slidable on a vertical rail 53 fixed to stanchion 8.

The weight of slide 44, of plate 25, of rollers 52 and of gauges 22–24 is balanced by means of a counterweight 54 that is axially movable within stanchion 8. Counterweight 54 is connected to slide 44 by means of a steel wire rope 79 that slides on pulleys 55 and 56 fixed to stanchion 8.

A tube 57 has an end fixed to wing 50 while the other end is partially closed by a cover 58 that has a hole 59 coaxial with tube 57.

A hydraulic jack 60 has a cylinder 61 that is fixed to plate 9 and a piston 62 with a stem 63 that is axially movable through hole 59 of cover 58. To stem 63 there is fixed a plate 64 that can axially slide inside tube 57.

A spring 65, located inside tube 57, is placed between plate 64 and wing 50.

The hydraulic circuit for the actuation of jack 60, is schematically shown in FIG. 2. The above hydraulic circuit includes an oil tank 66, pipes 67–71 for the flow of oil, a pump 72 for pumping the oil and a distribution valve box 73. The distribution valve box 73 includes solenoid valves controlled by unit 26, by means of which it is possible to deliver oil under pressure through tube 69 in order to make piston 62 translate downwards, to deliver oil under pressure through tube 70 in order to make piston 62 translate up, or simultaneously stop delivery of oil to and from tubes 69 and 70 so as to stop piston 62 in an intermediate position of its stroke.

Machine 1 further includes an electrical supply 74 with a pole connected to ground through metal frame 3, and the other pole connected to a first end of a coil 75 of an over-current relay 76. The second end of the coil 75 is electrically connected to plate 25.

Plate 25, body 28 and nosepieces 29 of the plug gauges 22–24 are made of steel or in any case of an electrically conducting material, so that the voltage generated by supply 74 is applied to each of the nosepieces of plug gauges 22–24.

Gearbox 2 to be checked and plate 10 are made of an electrically conducting material, furthermore plate 10 is grounded through connection to metal frame 3.

To the distribution valve box 73 there can be connected a pole of an electrical supply 77 by means of a switch 78 of relay 76. The other pole of supply 77 is connected to ground.

The machine operation is as follows. Gearbox 2 is loaded onto plate 10 and positioned with respect to it, by means of an automatic conveyor not shown. In this phase piston 62 is in contact with the upper wall of cylinder 61, gauges 22–24 are arranged at the maximum distance from plate 10 and do not contact gearbox 2.

After the positioning of gearbox 2, the conveyor actuates a microswitch, not shown, that enables the operation of unit 26.

Unit 26, by means of a multicore conductor 85, provides an electric signal to the distribution valve box 73 that controls the delivery of oil under pressure to tube 69. Due to the pressure of the oil, piston 62 moves down and spring 65 is compressed. When the resilient reaction due to the variation in length of the spring becomes greater than the resistance due to frictions that the slide 44 has to overcome in order to slide on rollers 52 and to the frictions due to the sliding of rope 79 on pulleys 55 and 56, slide 44 and the associated gauges 22–24 begin to translate downwards and the length of spring 65 does not vary any longer.

If gearbox 2 has been correctly positioned on plate 10 and if the holes 15–17 are not affected by excessive location and diameter errors with respect to the theoretical situation, nosepieces 29 of gauges 22–24 can enter into holes 15–17 without any interference between the surfaces of holes 15–17 and nosepieces 29. The only elements of gauges 22–24 that touch the surface of holes 15–17 are the feelers 40 and 41. As already mentioned, feelers 40 and 41 are made of industrial diamonds and consequently do not conduct electrical current, consequently even if arms 32 and 33 are live because they are connected to bodies 28, the electric circuit consisting of electrical supply 74, coil 75, plate 25, gauges 22–24, gearbox 2 and plate 10 is open. When the aforementioned circuit is open coil 75 is not energized, thus switch 78 is open. This fact allows slides 44 to continue its stroke until bringing plate 25 and gauges 22–24 in a measuring position defined by limit stops 80 and 81 (FIGS. 1 and 2). Limit stops 80 and 81 are fixed to plate 9 and insulated with respect to it in a way that has not been shown.

When plate 25 abuts against limit stops 80 and 81, piston 62 continues its stroke, further compressing spring 65, until it reaches the end of cylinder 61 and stops.

The force that spring 65—compressed as said above—transmits to slide 44 has a preset value to guarantee a stable and safe contact of plate 25 with limit stops 80 and 81.

When plate 25 contacts limit stops 80 and 81 it actuates a proximity microswitch 82 that provides a measurement enabling signal to unit 26. As a consequence of this signal unit 26 processes the signals provided by the transducers associated with the gauges 22–24. These signals are indicative of the values of the diameters of holes 15–17.

When the diameters of holes 15–17 have been checked, unit 26 sends a signal to distribution valve box 73 for controlling delivery of oil under pressure to tube 70 and consequently the retracting of slide 44 from gearbox 2. At this point gearbox 2 can be removed and replaced with another one to be checked.

Suppose now that one of the holes, for example hole 15, has a larger diameter than that of nosepiece 29 of gauge 22 and that the axis of hole 15 is offset from its theoretical position of an amount more than half of the difference of the two previously mentioned diameters. At a certain point of the approach movement of slide 44 towards gearbox 2 there occurs contact between nosepiece 29 of gauge 22 and the surface of hole 15. This contact occurs, initially, in correspondence to a tapered end 83—see FIG. 3—of nosepiece 29, that acts as a guide for entering of nosepiece 29 into the hole to be checked.

The contact between nosepiece 29 and gearbox 2 connects to ground the circuit that includes electrical supply 74 and coil 75. Current passes through coil 75 and the coil 75 controls closure of switch 78 so that the voltage of supply 77 is applied to distribution valve box 73 provoking simultaneously the closure of pipes 69 and 70 and the consequent stop of piston 62 in an intermediate position of its stroke.

Owing to the inertia of slide 44, plate 25 and gauges 22-24 and of the delay between the contact of a nosepiece 29 with gearbox 2 and the consequent stopping of piston 62, slide 44 tends to continue its stroke towards gearbox 2.

If, as normally may happen, the axis of hole 15 is offset with respect to the axis of nosepiece 29 of gauge 22 in an amount that slightly exceeds half of said difference, nosepiece 29, urged by piston 62, owing to tapered end 83 will partially enter into hole 15 and deform itself.

The entity of the deformation will however be within the elastic limit and therefore nosepiece 29, when withdrawn from hole 15, will take again its original shape and plug gauge 22 will not be damaged.

Seldomly it may happen that the positioning of gearbox 2 is wrong—so that in the position where there should be arranged a hole there is a solid part—or that a gearbox 2 has at least a hole 15-17 with a diameter smaller than the diameter of the nosepiece 29 which should enter into the hole. In these cases, lowering of slide 44 will cause the impact of a nosepiece 29 with gearbox 2 and the sudden stopping of slide 44. Due to this impact, similarly to the case described before, the circuit including electrical supply 74 and coil 75 and consequently switch 78 are closed and piston 62 stops in an intermediate position of its stroke. Since piston 62 does not apply any more a force tending to lower slide 44, plug gauges 22-24 are not damaged as a consequence of the impact of nosepiece 29 with gearbox 2.

Unit 26 is provided with a push button 84, shown in FIG. 1, for manually controlling distribution valvebox 73 to move slide 44 away from gearbox 2 and put again the machine in normal operating condition.

An advantage of the machine according to the invention resides in the possibility of detecting the presence of chips or burrs within the holes 15-17 to be checked. In fact, the burrs or the chips, by contacting gearbox 2 and nosepieces 29 when the latter enter into holes 15-17, close the circuit including electrical supply 74 and coil 75, thus causing stopping of piston 62 and slide 44. The operator of the machine 1 can intervene and remove the chips or burrs.

The machine 1 is particularly adapted to gauge mechanical pieces before the final assembling because, in addition to the condition that these pieces be dimensionally accurate, it is necessary that no chips or burrs are present because they could detrimentally affect the assembled device or apparatus.

A further advantage of a machine according to the present invention, as compared to the gauging machines provided with mechanical recoil, is now explained. In the machines provided with a mechanical recoil device it is possible that the elements of a plug gauge for checking a small diameter are rather flexible and that a small interference amounting between the nosepiece and the part generates forces having values sufficient to deform the nosepiece and other elements of the plug gauge without obtaining the proper operation of the recoil device (this is also due to the circumstance that often a single mechanical recoil device is provided for several plug gauges).

The deformations of the plug gauge may not be detrimental for the plug gauge itself, if they are within the elastic limits of the materials, and it is possible that the accuracy of the measurements of the different diameters is not affected by these deformations, but the deformations may result in inacceptablility when it is necessary to check dimensional features, such as the distances between different holes of the part, which require processing of the signals provided by a plurality of plug gauges. This processing is based on the condition that the mutual positions of the plug gauges are known and constant. Of course, this condition can be modified in the case described before and the relevant results of the checking would be wrong. These inconveniences do not arise in the machine according to the present invention because the contact of a nosepiece with the part to be checked causes stopping of slide 44 before the slide abuts against limit stops 80 and 81, and thus microswitch 82 does not enable the measurements to be taken.

A variant to the machine 1 consists in the actuation of slide 44 by a pneumatic jack instead of a hydraulic jack.

A second variant to the machine 1 consists in the use of electrically conducting and resilient projections to be coupled with the nosepieces for detecting the presence of a solid surface near a plug gauge 22-24.

These projections, by contacting gearbox 2, close the circuit including electrical supply 74 and coil 75 and therefore slide 44 stops before nosepieces 29 contact gearbox 2. Therefore, the delay involved by the slide stopping only causes the resilient deformation of the projections, while the plug gauges are not affected by it.

According to a further variant, it is possible to substitute for relay 76, an electronic circuit with static components including, in place of switch 78, a transistor driven by the current flowing through the circuit comprising electrical supply 74, plate 25, plug gauges 22-24, piece 2 and plate 10.

It is evident that the machine described can undergo further modifications and variants equivalent from a functional and structural point of view without departing from the scope of the invention.

What is claimed is:

1. A gauge for checking features of a mechanical piece, comprising: a first support for the piece; a second support, the first and the second support being movable one with respect to the other; actuation means to control the relative movement of the supports; gauging means with feeler elements adapted to cooperate with the piece and protection means for protecting the feeler elements, the gauging means being coupled to the second support in order to be selectively arranged in a gauging position—where the feeler elements cooperate with the piece—for providing a signal responsive to said features and in a rest position; and safety means for preventing the gauging means from getting damaged as a consequence of incorrect piece positioning on the first support, or whenever the piece to be checked has an irregular shape, said safety means including a first circuit with first circuit means associated with the first support and including the piece, a second circuit means associated with the second support and control means connected to the actuation means, the first and the second circuit means being adapted to close the first circuit and to switch the control means for stopping said relative movement.

2. The gauge according to claim 1, wherein the first circuit means comprise said protection means, said first circuit being closed due to the contact of the protection means with the piece.

3. The gauge according to claim 2, wherein the piece and the protection means are electrically conductive and wherein the first circuit is an electrical circuit the closure of which causes the flow of electrical current through the protection means and the piece.

4. The gauge according to claim 3, wherein the gauging means comprise a gauging device for checking linear dimensions of the piece, the gauging device including transducer means coupled to the feeler elements for providing said signal, the feeler elements including movable arms with feelers adapted to contact the piece; and wherein said protection means comprise an outer housing and said first circuit comprises an electrical supply connected to the outer housing and grounding means for grounding the piece.

5. The gauge according to claim 4, wherein the gauging device is a plug gauge for checking diametral dimensions of a hole of the piece and said housing includes a nosepiece for protecting the movable arms, the nosepiece being adapted to enter into said hole without contacting the piece, if the dimensions and the positioning of the piece on the first support are correct.

6. The gauge according to claim 5, wherein said feelers comprise insulating elements adapted to contact the piece.

7. The gauge according to claim 6, wherein the first support is stationary and the second support is a movable slide; the actuation means including a cylinder and piston device; the control means including electrical circuitry for controlling the cylinder and piston device.

8. The gauge according to claim 7, wherein the first circuit includes third circuit means for controlling said electrical circuitry to stop said piston.

9. The gauge according to claim 8, wherein said cylinder and piston device is coupled to said second support through resilient means.

10. The gauge according to claim 9, comprising abutment devices for stopping the movable slide to arrange the plug gauge in the gauging position, and wherein said resilient means include a spring adapted to thrust the slide against the abutment devices for providing a stable positioning of the plug gauge with respect to the piece.

* * * * *